Jan. 27, 1970  E. R. POLK  3,491,791
FLUTTER VALVE AND METHOD OF MAKING SAME
Filed Jan. 19, 1968

INVENTOR.
Edwin Rico Polk
BY
ATTORNEYS

United States Patent Office

3,491,791
Patented Jan. 27, 1970

3,491,791
FLUTTER VALVE AND METHOD OF MAKING SAME
Edwin Rico Polk, Fords, N.J., assignor to C. R. Bard, Inc., Murray Hill, N.J., a corporation of New York
Filed Jan. 19, 1968, Ser. No. 699,992
Int. Cl. F16k *15/16;* B32b *31/18*
U.S. Cl. 137—525.1                                  8 Claims

ABSTRACT OF THE DISCLOSURE

A flutter valve, particularly a small flutter valve, designed to be responsive to slight differences of fluid pressure, permitting passage of a fluid (gas or liquid) in one direction in response to higher pressure on the inlet side than on the outlet side and closing to prevent passage of a fluid (gas or liquid) in the opposite direction upon reversal of the pressure difference, the inlet side of the valve being constituted by a line opening, when closed, at the outer (inlet) end of a flat interface area between the contacting walls of an unusually short flat valve sleeve; and the method of making such valves of thin, preferably heat sealable plastic films or sheets.

---

There are numerous situations in the use of medical and surgical apparatus where tubing, of plastic or glass, is designed to conduct fluids along a required path or into or out of receptacles; and in which it is important to permit flow in one direction while preventing back flow. Flutter valves presently used in such systems (and elsewhere) are commonly formed by flattening a tubular body and building into the flattened portion an inherent tendency for the facing interior walls to rest against each other, thus closing the valve, except when separated by fluid pressure within the tapering interior of the valve which exceeds the pressure around the flattened portions. Such valves, requiring a more or less gradual transition from the circular cross-section to the straight line cross-section, are necessarily elongated axially, the length being usually several times the diameter. Examples may be found in Evans Patent No. 2,883,985, Apr. 28, 1959, and Overment Patent No. 3,312,221, Apr. 4, 1967.

According to the present invention the taper is eliminated, the valve comprising a flat film with a short slit across the middle of it and a short flat sleeve having its upper end integral with the flat film adjacent the slit and its lower end free to form the outlet. The flat film is preferably reinforced by a cover sheet of the same size, provided with an aperture in a position to permit passage of fluid to the slit and sealed to the first named film. The details of the structure may be most clearly understood by describing a preferred method of making it. In the drawing—where the thickness of the material is greatly exaggerated for purposes of illustration—

Figure 1:
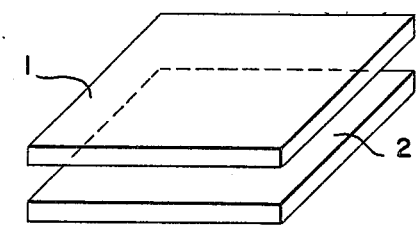
FIGS. 1 through 1E show successive steps in a preferred method of making the valve.
Figure 1A:
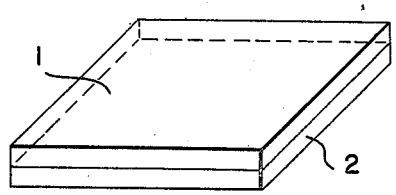
FIG. 1F represents a top plan view of the completed valve.
Figure 1B:
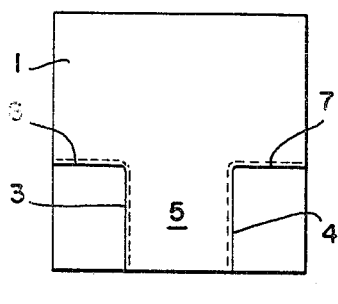
Figure 1C:
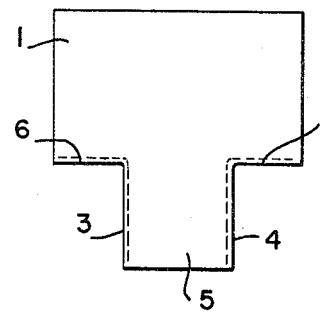
Figure 1D:
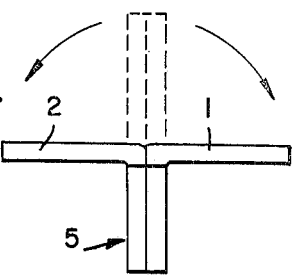
Figure 1E:
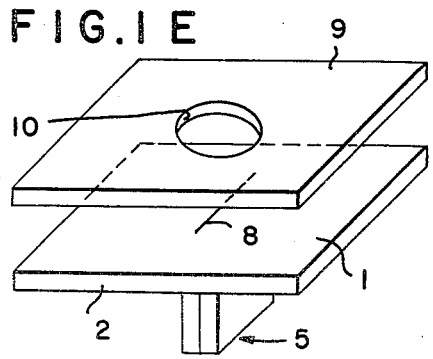
Figure 1F:
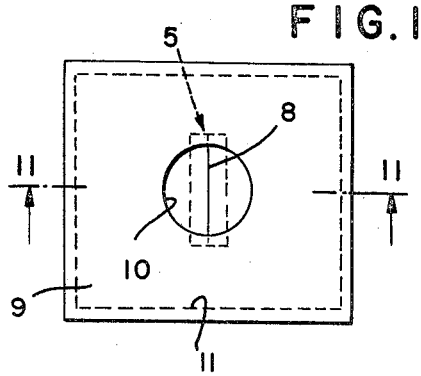
Figure 2:
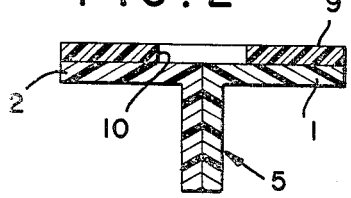
FIG. 2 represents a vertical section on the line II—II of FIG. 1F.
Figure 3:
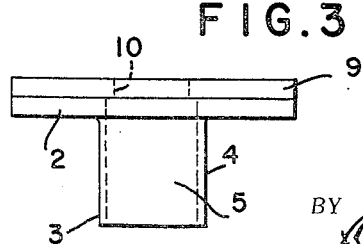
FIG. 3 represents an elevation from the right of FIG. 1F.

Referring to the drawings, which show only a single unit typical of a group most conveniently formed simultaneously, approximately square films 1, 2 are held together flatwise (FIG. 1A) and are subjected to the action of a cutting and sealing die which removes the lower left and right corners (FIGS. 1B and 1C) and seals the adjacent edges 3, 4, thus forming a flat rectangular sleeve 5. The upper halves of the films 1, 2 are then folded away from each other around the sealed edges 6, 7 (through 90°) to lie in the same plane (FIG. 1D), The slit 8 constituting the inlet end of the valve sleeve 5. The valve thus formed might be useful in some instances without more but it is preferable to apply a cover sheet 9 of somewhat stiffer material, having a hole 10 in its center and being adapted for sealing onto the films 1, 2 peripherally along a zone 11 extending inward from the edges toward the slit 8.

As an order of magnitude for valves which have been found useful in venting closed drainage systems for bodily fluids, it may be noted that the completed valve may be approximately 1.2 cm. square with a valve sleeve .6 cm. in length, the material being vinyl and the films 1, 2 having 3 mil thickness while the cover sheet 9 may be about 10 mils. Comparable results can be obtained with valves embodying the same principle but of different dimensions and/or materials, such as polyethylene. The terms "film" and "sheet" as used herein will be understood to be interchangeable if required by modification in thickness.

Particularly satisfactory results have been obtained by using, for the films 1 and 2, material having one smooth surface and one matte surface, the films being put together in such a way that the contacting (inner) surfaces are different. This is believed to reduce the danger of the surfaces sticking together while still providing good resealing contact.

It will be appreciated that, in operation, an increase of relative fluid pressure on the upper surface of the valve tends to force the film in the middle (in the vicinity of the slit 8) downward and necessarily pulls apart the edges of the slit, permitting the fluid to enter the sleeve and pass therethrough with negligible resistance, due to the thinness and flexibility of the sleeve walls. On the other hand an increase of pressure from the other direction holds the sleeve walls tightly together, preventing leakage, and even a slight outward displacement of the slit area, separating the edges somewhat, still leaves almost the entire interface area within the sleeve in sealing contact. Inward displacement of the slit area is not opposed by the cover sheet 9. but outward displacement is definitely limited except in the area opposite the hole 10.

What I claim is:

1. A flutter valve comprising a flat film traversed by a slit spaced from the edges of the film and a flat sleeve having one open end secured to the sheet in a position such that the slit is in communication with the interior of the sleeve, the inner wall surfaces of the sleeve being in contact throughout substantially their entire area, said flat film being constituted by portions of two films sealed together along a straight line, the slit being constituted by an interruption of the seal between spaced portions of said straight line and each wall of the flat sleeve being integral with one of said two films and joined thereto throughout the length of said slit.

2. A flutter valve according to claim 1 in which the flat sleeve is substantially rectangular in outline and has a length less than twice the length of the slit.

3. A flutter valve according to claim 1 which includes a cover sheet affixed to the flat film and provided with an opening opposite the slit.

4. A flutter valve according to claim 3 in which the cover sheet is approximately the same size and shape as the flat film and is affixed thereto peripherally, the opening being circular and of a diameter no greater than the length of the slit.

5. A flutter valve according to claim 3 in which the cover sheet is stiffer than the flat film.

6. The method of making a flutter valve which includes bringing together flatware two films of heat sealable plastic material, cutting out two spaced areas of said films and, sealing the films together along the edges of said cut out areas to form a flat sleeve in the space between said areas, and folding the portions of said films adjacent said sleeve away from each other to lie in a single plane as a flat film with one end of the sleeve attached thereto and a slit opening into said sleeve.

7. The method according to claim 6 which includes the further step of providing a cover sheet having an opening, and affixing the cover sheet to the flat film in a position such that the opening in the cover sheet permits passage of fluid to the slit opening into the sleeve.

8. The method according to claim 7 in which the cover sheet is approximately the same size and shape as the flat film, said sheet being affixed to said flat film by heat sealing peripherally of said sheet and film.

References Cited

UNITED STATES PATENTS

| | | | |
|---|---|---|---|
| 1,702,974 | 2/1929 | MacDonald | 137—525.1 |
| 2,594,318 | 4/1952 | Langdon | 137—525.1 X |
| 2,652,336 | 9/1953 | Hensgen et al. | 229—62.5 X |
| 2,696,342 | 12/1954 | Toborg. | |
| 2,697,531 | 12/1954 | Hood. | |
| 2,700,165 | 1/1955 | Talisman. | |
| 2,799,314 | 7/1957 | Dreyer et al. | 229—62.5 X |
| 3,361,334 | 1/1968 | Terzuoli | 229—62.5 X |
| 3,423,907 | 1/1969 | Hughes | 229—62.5 X |

WILLIAM F. O'DEA, Primary Examiner

D. J. ZOBKIW, Assistant Examiner

U.S. Cl. X.R.

29—157.1; 128—275, 295; 156—196, 250, 290